AUTOMATIC SYNCHRONIZATION RECOVERY TECHNIQUES FOR CYCLIC CODES

Filed March 17, 1966 4 Sheets-Sheet 1

INVENTOR
S.Y. TONG
Lucian C. Canepa
ATTORNEY

AUTOMATIC SYNCHRONIZATION RECOVERY TECHNIQUES FOR CYCLIC CODES

Filed March 17, 1966 4 Sheets-Sheet 2

Sept. 9, 1969 SHIH Y. TONG 3,466,601

AUTOMATIC SYNCHRONIZATION RECOVERY TECHNIQUES FOR CYCLIC CODES

Filed March 17, 1966 4 Sheets-Sheet 3

AUTOMATIC SYNCHRONIZATION RECOVERY TECHNIQUES FOR CYCLIC CODES

Filed March 17, 1966 4 Sheets-Sheet 4

United States Patent Office 3,466,601

Patented Sept. 9, 1969

3,466,601

AUTOMATIC SYNCHRONIZATION RECOVERY TECHNIQUES FOR CYCLIC CODES

Shih Y. Tong, Middletown, N.J., assignor to Bell Telephone Laboratories, Incorporated, New York, N.Y., a corporation of New York Filed Mar. 17, 1966, Ser. No. 535,164
Int. Cl. G06f *11/12*
U.S. Cl. 340—146.1 30 Claims

ABSTRACT OF THE DISCLOSURE

An arrangement of providing automatic synchronization recovery is disclosed for use in data transmission systems which employ error-correcting cyclic codes. Each data word to be transmitted is modified by adding to the word a fixed predetermined sequence. The modified word is then transmitted to the receiving terminal where another predetermined fixed sequence is subtracted from the word. The word is then decoded in accordance with a preselected decoding strategy to determine whether a synchronization slippage has occurred and, if so, the direction of the slippage. Word framing between the transmitting and receiving stations is then adjusted accordingly. With this arrangement, both synchronization errors and errors caused by channel noise can be detected by the decoder and distinguished.

Figure 1:
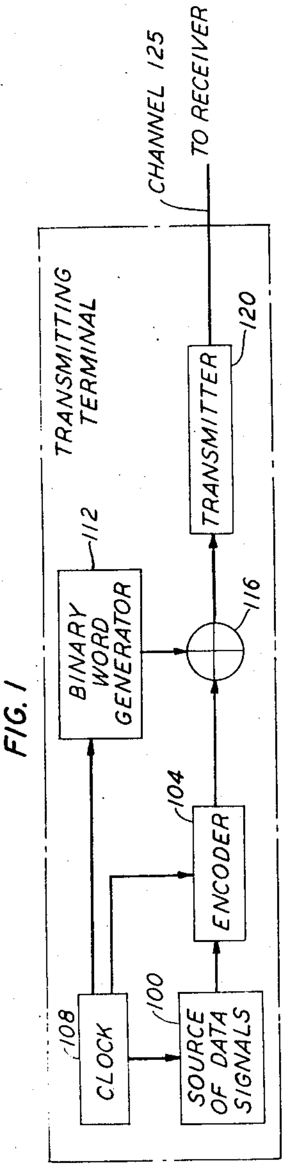

This invention relates to digital data transmission systems and more particularly to automatic synchronization recovery techniques embodied in transmitting and receiving equipment in such systems.

The need for accurate transmission and processing of digital data is well recognized in such areas as telegraphy, telephony, and computer and automation technology. Most often, such digital data is represented or coded in sequences of binary signals (hereafter referred to as bits). Each position in any sequence or code word consists of a bit "0" or "1," the different code word permutations of bits representing different items of information. Of course longer messages can be represented by combinations of code words just as the symbols of an alphabet are used to construct words and then words used to construct sentences.

Methods of improving the accuracy of transmission of binary information range from simple single error-detection schemes requiring the appending of a single bit to each code word to be transmitted to more elaborate schemes of error correction requiring the deliberate choice of special code words to represent the information or data. Examples of the latter are binary cyclic codes, as described in "Error-Correcting Codes" by W. W. Peterson, The M.I.T. Press and John Wiley & Sons, 1961.

Each word in a binary cyclic code is a cyclic permutation of some other word also in the code. Because of this characteristic, a loss of synchronization in a data system employing cyclic codes may not be detected by the receiver, in which case received words would be erroneously interpreted as being correct. Even if such loss of synchronization resulted in the receiver detecting an error, it may interpret such error as additive error (i.e. that caused by channel noise) rather than as arising from a synchronization loss. This need for detecting loss of and restoring synchronization is present in nearly all digital data transmission systems.

The most common method of providing transmitter and receiver synchronization is to separate each transmitted code word either by some distinctive sequence of bits not used for message information or by some distinctive signal different from the two used to represent the binary symbols. The disadvantage of the first scheme, of course, is that the additional redundancy provided for synchronization reduces the overall rate of information transmission. With the second scheme, the requirement of a third signal for framing increases the bandwidth requirements of the communication channel. In either case, considerable expense may be attached for providing synchronization.

Another synchronization technique is to provide the data transmission system with conventional error-detection capabilities and presume that when the number of detected errors exceeds some predetermined threshold value, the system is out of synchronization. One such scheme is described in Patent 3,159,811, issued Dec. 1, 1964, to D. B. James and W. T. Wintringham. Correction after detection of synchronization loss in systems using the above technique generally requires stopping and restarting the whole system with a resultant loss of time and perhaps even data. In addition, there is no way to distinguish between additive errors and synchronization errors. For example, if the communication channel were subject to excessive noise, this might be falsely interpreted as a synchronization loss. Since the two types of errors cannot be distinguished, certainly the direction of synchronization slippage cannot be determined (i.e. whether a synchronization gain or loss has occurred). Finally, if the synchronization slippage is only a few bits, and the transmitted data is of such a nature that the error threshold is not exceeded, the received sequences would again be falsely interpreted.

Accordingly, it is an object of this invention to provide a data transmission system which has the capability of correcting for synchronization loss without interrupting the transmission of data.

Another object of the present invention is to provide a data transmission system which is capable of detecting and distinguishing additive errors due to channel noise and errors due to loss of synchronization between the transmitting and receiving equipment.

Another object of this invention is to provide for detecting the direction of synchronization loss in the data transmission system, that is, detecting whether the receiver has gained or lost bits in the synchronizing process.

A further object of this invention is to enable the recovery of synchronization with the requirement of few or no additional framing bits and without requiring the transmission of a unique framing signal.

A still further object of the present invention is to enable the automatic recovery of synchronization for binary cyclic codes in an efficient and economical fashion.

These and other objects of the present invention are illustrated in a specific system embodiment in which information signals to be transmitted from one location to another are first encoded into an error-correcting binary cyclic code. Each resultant code word contains $k$ information bits and $(n-k)$ parity check bits. A specific preselected binary word is then combined with each code word to be transmitted by adding (addition modulo 2) the first bit of the $n$-bit code word to the first bit of the preselected binary word, the second bit of the code word to the second bit of the binary word, etc. The resulting word is then transmitted over the data channel to the receiving terminal where another preselected binary word (in some instances, it may be the same word as that added at the transmitting end) is subtracted from the word received. (Subtraction is the same as addition for the binary case.) The word obtained from subtraction is then divided by what is called the generator polynomial of the particular cyclic code being used. (The generator polynomial is simply a binary word used in the encoding and decoding of cyclic codes. This will be explained in more detail later.) From this division, the remainder or so-called syndrome is obtained, which is in turn used to generate an error pattern. This pattern indicates that either no error has occurred, that channel noise has introduced additive errors, or that an out-of-synchronization condition exists. In addition, the error pattern indicates the direction of synchronization loss. This error indication is then supplied to associated circuitry in the receiver and appropriate steps are taken to correct whichever type error has been detected.

It is a feature of this invention that a data transmission system utilizing a binary cyclic error-correcting code comprise a transmitting terminal in which code words to be transmitted via a communication channel to a receiving terminal are modified by addition modulo 2 of a fixed preselected binary word.

It is also a feature of this invention that the data transmission system include a receiving terminal in which a fixed binary word is subtracted from each received code word.

It is still another feature of this invention that each binary word obtained from subtracting the fixed binary sequence from each received data word at the receiving terminal be processed according to a particular decoding strategy to obtain binary word error patterns which uniquely represent the synchronization condition of the channel.

It is also a feature of this invention that the receiving terminal automatically adjust synchronization of word framing in response to the determination of the synchronization condition.

Figure 3:
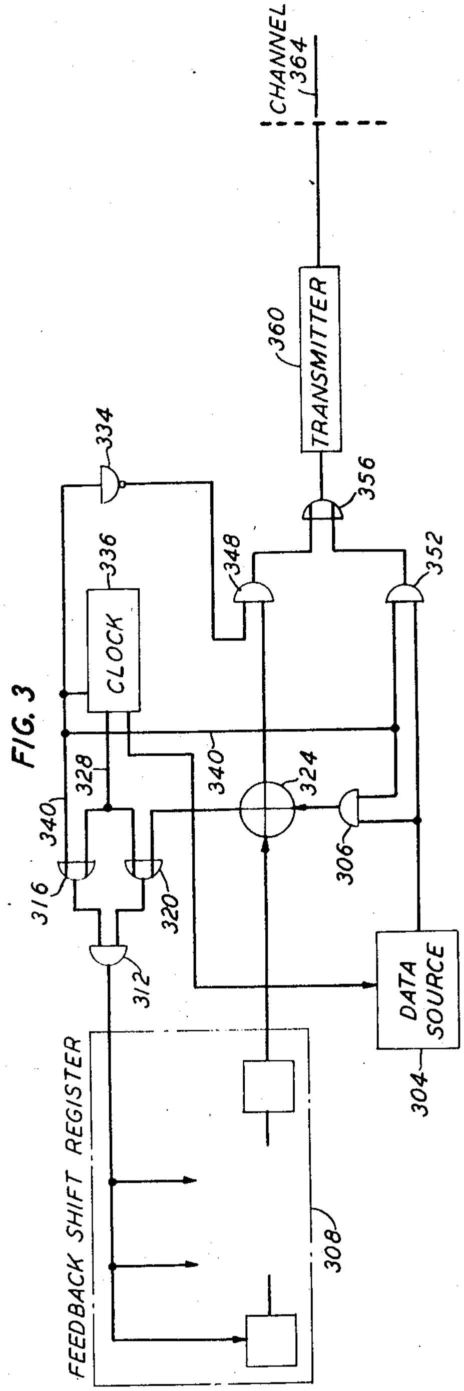
Figure 2:
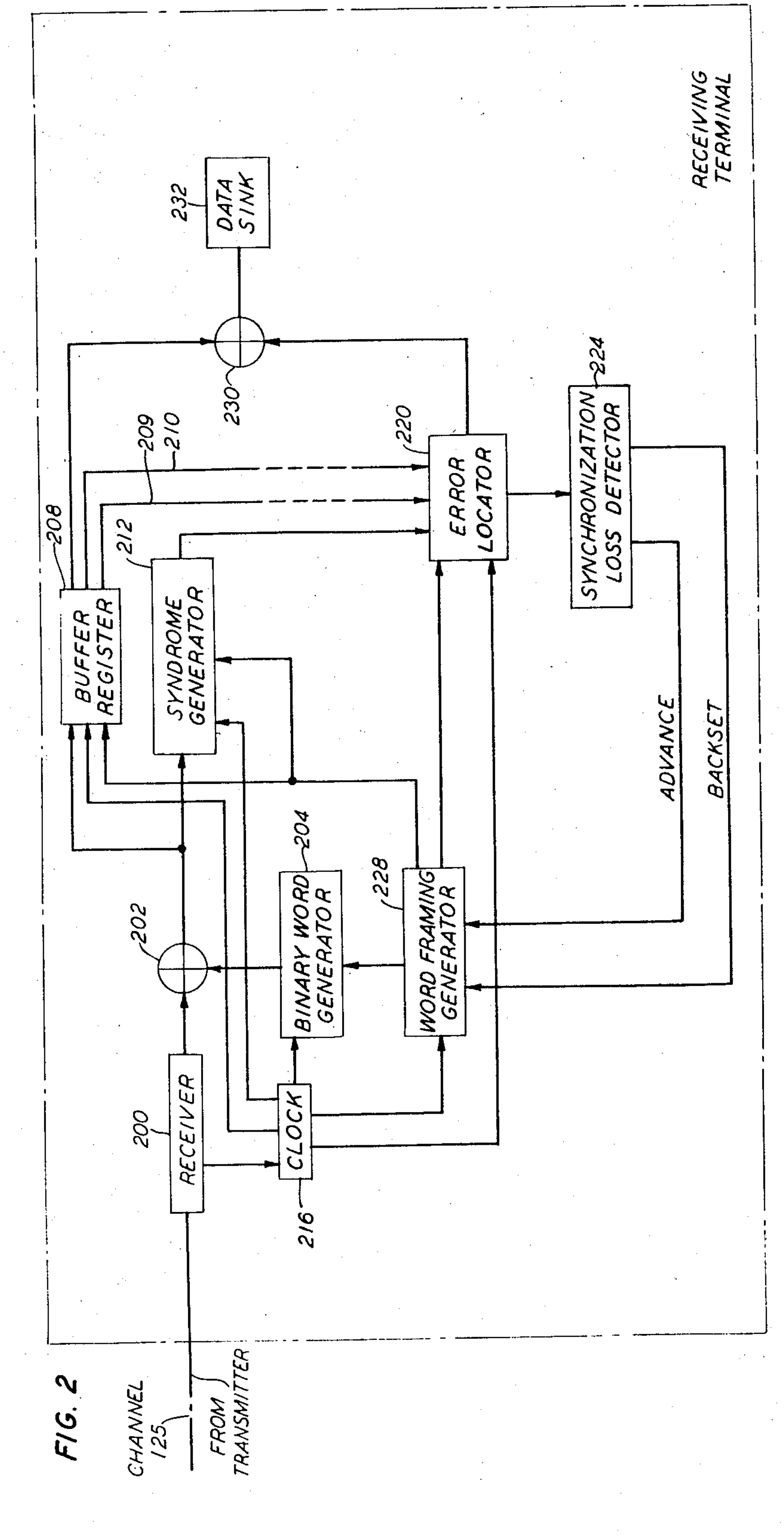
Figure 4:
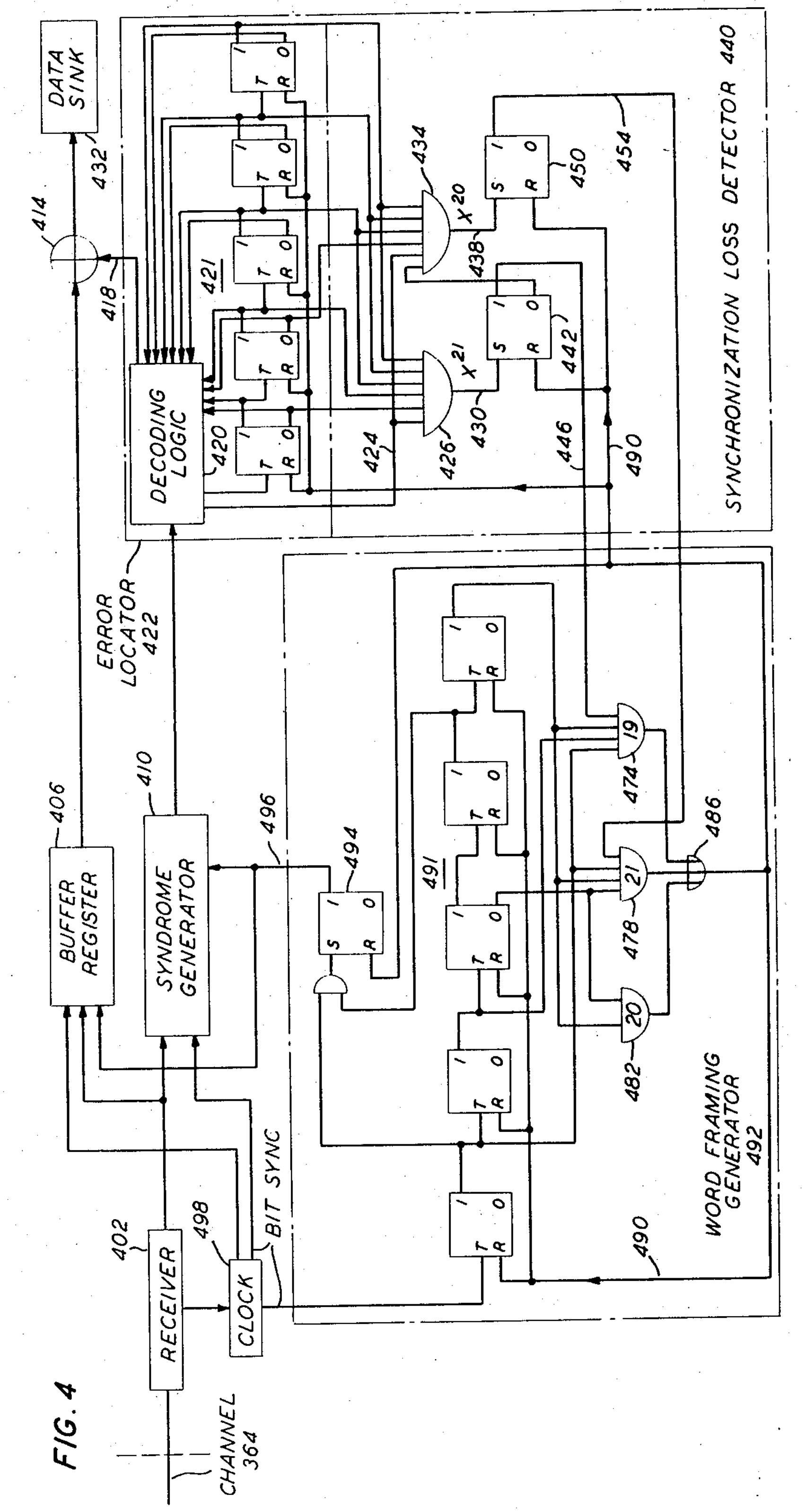
Figure 5:
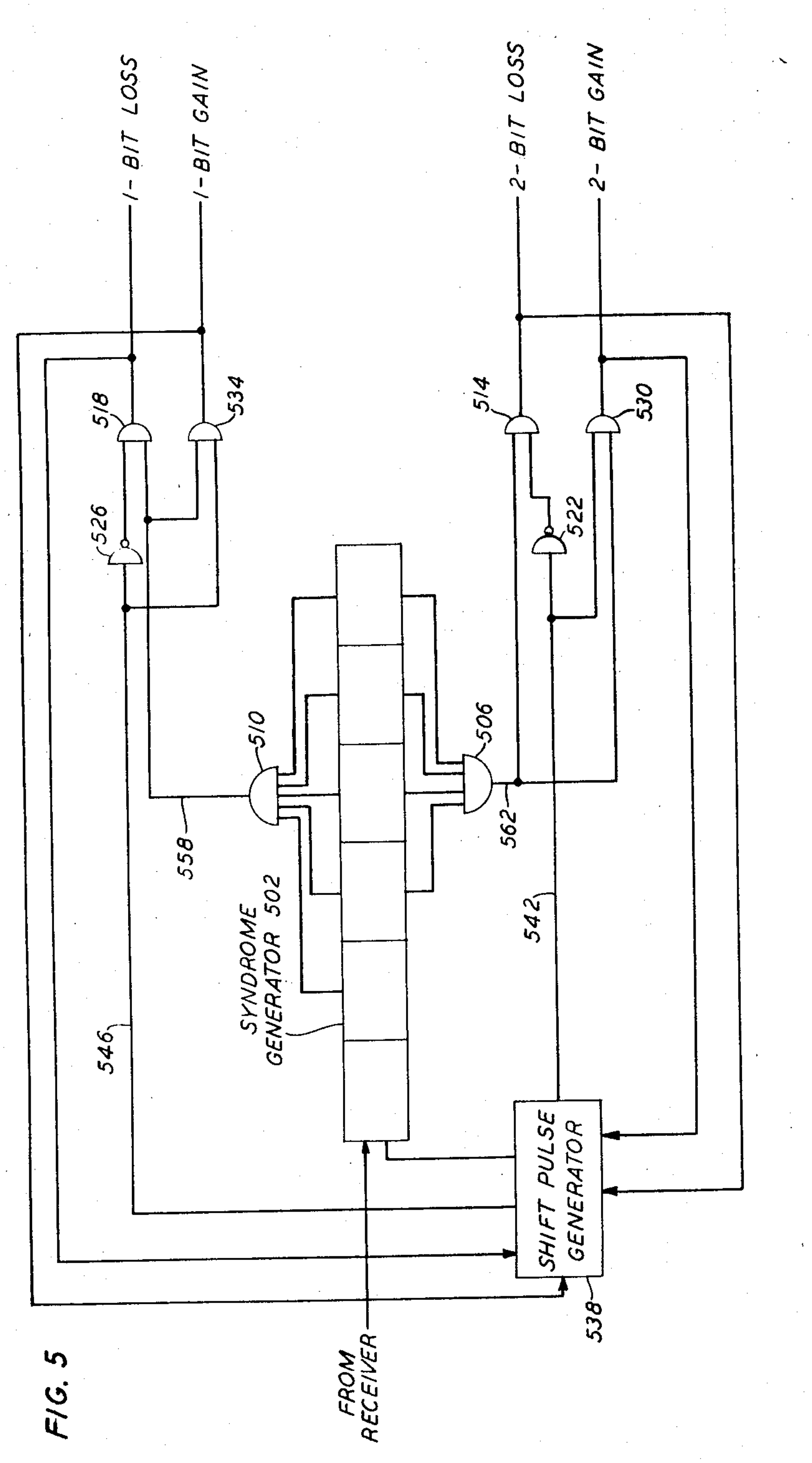

A complete understanding of the present invention and of the above and other objects, features, and advantages thereof may be gained from a consideration of the following detailed description of specific illustrative emobdiments presented hereinbelow in connection with the accompanying drawings, in which:

FIGS. 1 and 2 show, respectively, transmitting and receiving terminals which together comprise a generalized illustrative, error-correcting, synchronization recovery system made in accordance with the principles of the present invention;

FIGS. 3 and 4 show, respectively, transmitting and receiving terminals comprising a specific illustrative triple error-correcting synchronization recovery system employing the well-known (23, 12) Golay code shortened to a (20, 9) code and capable of at least one-bit synchronization loss correction; and FIG. 5 shows a specific illustrative synchronization loss detection circuit for use with a full-length $(n, k)$ cyclic code which has synchronization recovery ability of at least 2 and where $n-k=6$.

The transmitting terminal shown in FIG. 1 includes a source 100 for supplying binary data signals in which each $k$-bit binary sequence comprises a data word. The various combinations of the $k$ bits, of course, represent message information which is to be transmitted to an associated receiving terminal. The $k$-bit data words are delivered to an encoder 104 which generates $n-k$ binary check digits or parity bits from the data words according to a specific binary cyclic encoding strategy. The $k$-bit data word plus the $n-k$ partity bits comprise an $n$-bit binary cyclic code word. Methods for encoding data into binary cyclic code words are discussed in the previously-cited Peterson text, pages 148-156.

Before proceeding further, it will be helpful to briefly discuss the algebraic representation of binary codes and coding processes. In general, a $k$-bit information sequence may be represented by a polynominal of the form, $$A(x)=a_0+a_1x+ \dots +a_{k-1}x^{k-1} \qquad (1)$$

in which each of the coefficients $a_0, a_1, \dots a_{k-1}$ represents either a "0" or "1." For example, the binary sequence 101101 may be represented by the polynomial $1+x^2+x^3+x^5$. With such representation, the information bits corresponding to the high-order coefficients are thought of as being transmitted first.

A binary cyclic code is generally defined in terms of a generator polynomial $G(x)$ of degree $n-k$. The $n-k$ parity bits or check bits discussed above are obtained by dividing the $k$-bit data word having $n-k$ "0's" appended to it [represented by $x^{n-k}A(x)$] by the generator polynomial $G(x)$. The remainder $R(x)$ represents the parity sequence to be added to the data word $x^{n-k}A(x)$.

The code word to be transmitted (or, in our case, to be applied to a modulo 2 adder) can thus be represented by $$F(x)=x^{n-k}A(x)+R(x) \qquad (2)$$

To logically perform these operations, the encoder 104 includes a shift register of $n-k$ stages with appropriate feedback connections as discussed in the aforecited Peterson text. After $k$ information bits have been shifted into such an encoder and through to the modulo 2 adder 116, the feedback connection of the encoder is disabled and the contents of the shift register are delivered to the modulo 2 adder 116.

Application of the $n$-bit code word by the encoder 104 to the adder 116 is done in response to signals or pulses from a clock 108. Each bit of the code word is thereupon added (addition modulo 2) to a corresponding bit of a binary word $P(x)$ generated by a binary word generator 112. The binary word $P(x)$ is chosen so that error patterns obtained in the decoding process for synchronization loss will be different from error patterns obtained for additive error. This will be explained in greater detail later and specific choices of the binary word $P(x)$ which satisfy this criterion for particular binary cyclic codes will be given.

The modified code word resulting from modulo 2 addition of the fixed binary word $P(x)$ and the code word $F(x)$ is then applied to a transmitter 120 for transmission over a communication channel 125. As will be shown in later specific applications, this word may or may not be further modified by appending "0's" to each end of the word. The specific characteristics of the code utilized will determine whether or not "0's" are to be appended and, if so, how many are required. The appending of "0's" may be accomplished simply by appropriate timing. If, for example, that bit "1" is represented by the presence of a pulse of electrical energy and the bit "0" by the absence of a pulse, then the clock would simply time for an appropriate period between generation of code words. Thus a certain number of "0's" or "lack of pulses" would be inserted between code words to be transmitted.

Upon receipt of the modified code word (which may include errors caused by channel noise), a receiver 200 (FIG. 2) signals a clock 216 that the received word is to be applied to a modulo 2 adder 202. The clock, in turn, signals a binary word generator 204 to apply the same binary word $P(x)$ to the modulo 2 adder 202. Each bit of the received code word is then added (addition modulo 2) to a corresponding bit of the binary word $P(x)$. (Actually it is not necessary to add the same binary word $P(x)$ at the receiving end provided that the addition at the transmitting end did not affect any of the information bits. This, of course, would be the case if the bits of $P(x)$ added to the information bits of the code word were "0's." In such cases, *any* binary word which yields the same remainder as does the word $P(x)$ when divided by the generator polynomial $G(x)$ could be used. If no additive error (channel noise) or synchronization loss has occurred, the addition performed at the receiving terminal restores the modified code word to its previously unmodified condition, that is, to the binary cyclic code word $x^{n-k}A(x)+R(x)$.

The word obtained from modulo 2 addition is then transferred to both a buffer register 208 where it is stored to await possible further modification and a syndrome generator 212 performs certain logical operations to obtain what is called a syndrome (a digital sequence or word). The syndrome may be obtained by either dividing the received word (received from the modulo 2 adder 202) by the generator polynomial $G(x)$, in which case the remainder is the desired syndrome, or by generating new parity bits from the data portion of the received word and adding (addition modulo 2) the new parity sequence to the received parity sequence, the resulting sum being the required syndrome.

The syndrome is then delivered to an error locator 220 where it is processed to obtain the location of errors in the received word—an error pattern $E(x)$. In the case of synchronization slippage, either identifying the position of the error is not possible or the position identified is not consistent with the code being utilized. In either case, the error pattern $E(x)$ is interpreted as resulting from an out-of-synchronization condition. The pattern will also indicate whether a synchronization loss or gain has occurred. [This, however, is to be determined by the synchronization loss detector 224 (to be described later).]

Obtaining the error pattern $E(x)$ can be accomplished in either of two ways. The more straightforward method is to compare each syndrome received from the syndrome generator 212 with each syndrome of a list stored in a permanent memory. Each syndrome in memory would be associated with its corresponding error pattern such that when a match occurred between the received syndrome and a syndrome in memory, the associated error pattern could be read out. If the error-correcting ability of the code is not exceeded, each syndrome will uniquely identify one specific combination of errors (refer to W. W. Peterson's text, chapter 9). Also, additive errors will not be mistaken for synchronization errors and vice-versa. The above method is impractical for syndromes containing many bits, since the amount of permanent memory required would be prohibitively expensive.

A more detailed explanation of a possible arrangement for locating error positions by "matching" as discussed above is described in a copending application of R. N. Watts, Ser. No. 439,650, filed Mar. 15, 1965 now Patent No. 3,411,135.

The error patterns $E(x)$ can also be obtained by performing certain logical calculations upon the syndromes. The previously-cited Peterson text describes such calculations in detail on pages 167–175. In addition, a copending application of H. O. Burton, Ser. No. 429,386, filed Feb. 1, 1965, now Patent No. 3,389,375 describes a particular method of obtaining the error patterns $E(x)$ from logical calculations.

After obtaining the error pattern, one of several things might be done. One possibility would be to commence the additive error-correcting procedure (to be explained) before or during the determination of the synchronization condition of the system. If an out-of-synchronization condition were detected, then the data system user could be signaled to ignore the previously "additive error" corrected word, since the word would not have been properly corrected. Another possibility would be to first determine the synchronization condition of the system and if no out-of-sync condition were present, commence the additive error-correcting procedure, while if an out-of-sync condition were present, simply not perform additive error correction until synchronization was restored. Since the choice of either of the above (or any other) procedures is not significant to the invention, no further reference to them will be made. Additive error correction and synchronization loss correction will be explained assuming that some procedure, although not specified, has been chosen.

The error patterns are $n$ bits in length and contain "1's" in each position corresponding to a position in the received code word which was received in error. Thus, additive errors are corrected by simultaneously applying the error pattern of a received code word and the code word stored in the buffer register 208 to a modulo 2 adder 230. As an erroneous bit in the data word is applied from the buffer register 208 to the adder 230, a "1" correction signal is applied from the error locator 220 so that erroneous "0" signals are converted to "1" signals and erroneous "1" signals are converted to "0" signals.

The error pattern $E(x)$ is also transmitted to the synchronization loss detector 224 for processing to determine if a synchronization loss or gain has occurred. After such determination, the synchronization loss detector 224 signals the word framing generator 228 to either advance or backset the framing. Though not illustrated in FIG. 1 or 2, the data system may be designed to request a retransmission upon detection of an out-of-synchronization condition provided, of course, that a reverse channel is available. In this case, the correction of framing would be performed on the retransmission code word. If a reverse channel is not available, then the receiving terminal is designed to either correct the synchronization on subsequently-received code words or correct synchronization on the code words already received and in storage. The method chosen is dependent upon the available facilities and the desires of the data system user.

Illustratively, the word framing generator 228 includes a counting circuit which simply counts an appropriate number of bit times between the generation of word framing signals. Upon receipt of a "backset" signal, the counting circuit counts *extra* bit times before causing word framing signals to be generated and applied to the apparatus shown in FIG. 2. In response to the "corrected" word framing signal, the binary word generator 204 applies the binary word $P(x)$ to the modulo 2 adder 202 a certain number of bit times later. The buffer register 208 and syndrome generator 212, also in response to the "corrected" word framing signal, "backset" their respective operations on received data. An advance in word framing is accomplished in similar fashion with the counting circuit in the generator 228 being directed to count a *fewer* number of bit times before causing the generation of word framing signals.

The two leads, 209 and 210, from the buffer register 208 to the error locator 220 are required in only one of the specific applications of the present invention. For this reason, these leads are indicated in FIG. 2 by dashed lines. The need for these leads will become clear when the specific arrangement in question is fully discussed later on.

For some codes, it is possible to detect the specific amount of synchronization slippage while for others it is only possible to detect that either a synchronization loss or gain has occurred. Examples for particular codes will now be discussed in detail.

Shortened cyclic codes with $t \geq 3$ error-correcting ability

If the $i$ leading information bits of an $(l, f)$ cyclic code are made identically zero and then omitted from the code word, the resulting code is called an $(l-i, f-i)$ shortened cyclic code. The bit positions omitted from the code word are called virtual bit positions. The error-correcting ability of any shortened cyclic code is at least as great as that of the cyclic code from which it was derived.

A cyclic code which corrects $t \geq 2r+2$ errors, where $r$ is any integer greater than 0 and is shortened $\geq 3r+1$ bits, can be utilized to detect a synchronization loss or gain of specifically $\beta$ bits where $\beta \leq r$. A cyclic code which corrects $t \geq 2r+1$ errors, $r>0$, and is shortened $\geq 2r+1$ bits, can be utilized to detect a synchronization loss if the loss is $\leq r$ bits and to detect a synchronization gain of specifically $\beta \leq r$ bits. (Alternatively, the code could be used to detect a sync gain of $\leq r$ bits and a sync loss of specifically $\beta \leq r$ bits.) Thus, for the latter code described, synchronization slippage in one direction can be detected, while for the other direction, the specific amount of bit slippage can be determined, provided that the slippage in either direction is $\leq r$ bits.

In the first case above, one possible choice of the binary word $P(x)$ to be added at the transmitting end and subtracted at the receiving end can be represented as $$P(x)=\left\{x^{n+\left[\frac{3r+1}{2}\right]}\right\} \qquad (3)$$

where $n$ is the number of bits in the shortened cyclic code word, and $$\left[\frac{3r+1}{2}\right]$$

represents the greatest integer less than or equal to $$\frac{3r+1}{2}$$

The notation $\{*\}$ represents either the syndrome of $*$ (syndromes having been discussed earlier) or any element which will give the same syndrome when divided by the generator polynomial $G(x)$. If only one meaning is intended, the particular meaning intended will be clear from the context.

The addition of $$\left\{x^{n+\left[\frac{3r+1}{2}\right]}\right\}$$

to the code word to be transmitted can be accomplished by adding one bit corresponding to position $$x^{n+\left[\frac{3r+1}{2}\right]}$$

at the encoder and decoder. However, since the bit corresponding to this position (i.e. the $$n+\left[\frac{3r+1}{2}\right]$$

position) is not actually transmitted, only the syndrome of $$x^{n+\left[\frac{3r+1}{2}\right]}$$

is added to the encoded word. The syndrome of $$x^{n+\left[\frac{3r+1}{2}\right]}$$

is the remainder obtained from dividing the polynomial $$x^{n+\left[\frac{3r+1}{2}\right]}$$

by the code generator polynomial $G(x)$. The decision rule for decoding in this case is as follows:

If the decoder determines that the bit corresponding to $$x^{n+\left[\frac{3r+1}{2}\right]}$$

is in error and in addition that (1) the bit corresponding to $$x^{n+\left[\frac{3r+1}{2}\right]+\beta}$$

is in error, $0<\beta\leq r$, then it is assumed that the system has lost $\beta$ bits; or that (2) the bit corresponding to $$x^{n+\left[\frac{3r+1}{2}\right]-\beta}$$

is in error, $0<\beta\leq r$, then it is assumed that the system has gained $\beta$ bits.

In the case of a cyclic code shortened by $\geq 2r+1$ bits, a possible choice of $P(x)$ is $\{x^n\}$ where, again, $n$ is the number of bits in the shortened cyclic code word. The decision rule for decoding in this case is:

(1) If the decoder determines that the bit corresponding to $x^n$ is in error, but not any $x^k$, $n<k\leq l-1$, where $l$ is the length of the cyclic code from which the shortened code is derived, then it is assumed that the system has gained a few bits in synchronization. By backsetting the word framing, the system will regain synchronization in at most $r$ word times (i.e. the time to transmit $r$ words).

(2) If the decoder determines that the one bit corresponding to $x^{n+\beta}$ is in error, $1\leq\beta\leq r$, then it is assumed that the system has lost specifically $\beta$ bits. In this case, synchronization is regained either in a step-by-step fashion as in (1) above or by a one-step correction.

Other values of $P(x)$ could also be utilized. For instance, if $P(x)=\{x^{l-1}\}$ then a decision rule which provides a one-step synchronization gain correction rather than sync loss correction is readily apparent.

It will be noted from the decision rules, that a synchronization slippage is indicated when the decoder determines that bits not transmitted (because the code was shortened) are in error. The fact that bits not transmitted are determined to be in error results because the decoding of shortened cyclic codes is carried out as if the received code word is not shortened, that is, as if the number of "0's" by which the code was originally shortened were adding or appending of "0's" on the received code word may not actually be done, but something equivalent is. Thus, if it is determined upon decoding that bits not transmitted are in error, then according to the given decision rules and criteria for encoding, this indicates a sync slippage has occurred.

A specific example illustrating the above-discussed capabilities for cyclic codes shortened $\geq 2r+1$ bits and having three or greater error-correcting ability will now be given.

Consider the triple error-correcting (23, 12) Golay code shortened to a (20, 9) code. Since this code is shortened by three bits and can correct three errors, it should have a sync-recovery capability of one bit.

The generator polynomial for the code is $$G(x)=1+x^2+x^4+x^5+x^6+x^{10}+x^{11} \qquad (4)$$
$$=101011100011$$

The syndrome of $P(x)=x^n=x^{20}$ is 00101101111.

Now suppose that the data $A(x)=x^8=000000001$ is to be transmitted. To generate the appropriate code word, the polynominal $x^{n-k}A(x)=x^{11}\cdot x^8=x^{19}$ would be divided by the generator polynomial $G(x)$ and the remainder added to $x^{19}$. This would give the code word

01011011110000000001 which would then be added to the syndrome of $P(x)=x^{20}$ to obtain the word to be transmitted or,

```
  01011011110000000001—code word
⊕ 00101101111000000000—syndrome of P(x)=x^20
  01110110001000000001—modified code word
```

Now assume that a one bit synchronization loss occurs, as indicated by the arrows in the diagram below (the commas represent the true framing).

```
                                          message
                                          flow
11,01110110001000000001,01               ——→
  ↑      receiver framing      ↑
```

At the receiving terminal, the syndrome of $P(x)$ would be added to the word shown between the arrows, above, along with three "0's" at the high order end, or

```
  10111011000100000000—received code word
⊕ 00101101111000000000—syndrome of P(x)
  10010110111100000000(000)—M1(x)
```

The addition of the three "0's" at the high order end, as mentioned earlier, expands the code to a full length cyclic code and enables the receiver to ultilize conventional cyclic decoding techniques. The syndrome of the message $M_1(x)$ is the remainder of $M_1(x)/G(x)$. This syndrome can be represented by the sum of the syndromes of $x^{21}$ and $x^0$ or $$\{M_1(x)\}=00111000110$$
$$=10111000110+10000000 \qquad (5)$$
$$=\{x^{21}\}+\{x^0\}$$

The decoder would thus determine that the bits corresponding to $x^{21}$ and $x^0$ are in error. But the bit corresponding to $x^{21}$ was not transmitted and $x^{21}=x^{20+1}=x^{n+\beta}$.

By decision rule (2) previously given, this would indicate that a one-bit loss had occurred.

If a bit gain occurred, the received message could be represented as, $$1, 01110110001000000001, 01$$

↑ receiver framing ↑

Adding the syndrome of $x^n$ and the three "0's" gives, $$\begin{array}{ll} 11101100010000000010 & -\text{received word} \\ \oplus 00101101111000000000 & -\text{syndrome of } x^n \\ \hline 11000001101000000010(000) & -M_2(x) \end{array}$$

The syndrome of $M_2(x)$ is $$01110110001=00101101111+01011011110 \quad (6)$$
$$=\{x^{20}\}+\{x^{19}\}$$

Since it is indicated that $x^n=x^{20}$ is in error but not $x^k$ for all $k$ such that $20=n<k\leq l-1=22$, from decision rule (1), it is determined that a bit gain has occurred.

FIGURES 3 and 4 show a data system for utilizing the (23, 12) Golay code shortened to (20, 9) and having at least a one-bit synchronization recovery capability as discussed above.

FIGURE 3 illustrates the logic necessary for encoding each nine-bit data word into a cyclic code word and for adding the polynomial $P(x)=x^{20}$ to each code word. A data word from a data source 304 is applied simultaneously and bit-by-bit to AND gates 306 and 352. The data bits corresponding to the coefficients of $x^{19}$, $x^{18}$, . . . , $x^{11}$ of the polynomial representation of the code word are applied to the AND gates 306 and 352 while lead 340 from a clock 336 is in the "high" or "on" condition. This serves to operate both of the gates 306 and 352 and to transfer the data therethrough to an OR gate 356 in one case and to a modulo 2 adder 324 in the other. From the OR gate 356, the data is delivered to a transmitter 360 for transmission over a channel 364. Simultaneously, the data is applied to the modulo 2 adder 324 where it is added to the contents of a feedback shift register 308. These contents comprise the syndrome of the polynomial $P(x)=x^n=x^{20}$. (It will be noted that for this particular illustrative embodiment of the invention no binary word generator per se is needed in the transmitting or receiving terminal. The generation and addition of the binary word $P(x)$ to each code word is accomplished as explained hereafter.) Adding the syndrome of $x^{20}$ to the data bits before such bits are applied to the feedback shift register for generation of the parity bits accomplishes the function of adding $P(x)$, or, in our case, the syndrome of $P(x)$, to the code word to be transmitted. The presence of the syndrome of $x^{20}$ in the shift register will be explained later. The resultant sum is then transferred through an OR gate 320 to an AND gate 312. The gate 312 is activated by the simultaneous application of the data and the "high" condition from the clock 336 over the lead 340 and through an OR gate 316. The data is then applied to the feedback shift register 308 where the appropriate 11-bit parity word is generated.

After the data word has been transferred to both the transmitter 360 and the shift register 308, the clock 336 causes the lead 340 to assume the "low" or "off" condition such that no more data from the data source 304 can be applied to either the transmitter 360 or the shift register 308. This "low" condition is inverted by an inverter gate 334 to a "high" condition which allows the contents of the shift register 308, that is, the parity word, to be transferred through the gates 348 and 356 to the transmitter 360. Just as or after the last bit (corresponding to bit $x^0$) is shifted out of the feedback shift register 308, and before the next data word is presented to the shift register for encoding, the clock 336 applies a pulse or bit to the feedback loop of the shift register over a lead 328 and through the gates 316, 320 and 312. This may be thought of as injecting a bit corresponding to $x^{20}$ of the next word. By injecting this bit, the syndrome of $P(x)=x^{20}$ is generated by the shift register to await the input of the next data word to which it will be added. This explains the presence of the syndrome of $x^{20}$ in the shift register when each data word is applied to the modulo 2 adder 324.

FIG. 4 shows receiving terminal apparatus for providing synchronization recovery with the shortened (20, 9) Golay code. Illustratively, a receiver 402 receives each transmitted word from the channel 364 and transfers it to both a buffer register 406 and a syndrome generator 410. The generator 410 comprises a feedback shift register similar to that used in the encoder. The required addition of the syndrome of $P(x)=x^{20}$ to the received word as well as the generation of the syndrome of this sum can thus be accomplished in a fashion similar to encoding. That is, the sum of the received word and the syndrome of $P(x)=x^{20}$ is divided by the generator polynomial $G(x)$ to obtain a remainder or syndrome.

The syndrome is then transferred to an error locator 422 comprising decoding logic 420 and a binary counter 421. The decoding logic 420 determines the error locations or error pattern of the received word. As previously discussed, this may be done by calculation or by matching the received syndrome with a list or table of syndromes and then reading out their corresponding error patterns. To correct additive errors, the error pattern is applied simultaneously with the received code word stored in the buffer register 406 to a modulo 2 adder 414. The resultant corrected word is then transferred to a data sink 432.

If from the decoding logic 420, it is determined that an error occurred at the position of the received word corresponding to $x^k$, then a pulse is applied over a lead 424 as the counter 421 reaches a count of $22-k$. Thus, as can be seen from the configuration of the counter output leads to AND gates 426 and 434, the gate 426 is activated only when an error has occurred in the position corresponding to $x^{21}$, that is, when a pulse is applied over the lead 424 at the count of $22-21=1$. The gate 434 is activated only when an error occurs in the position corresponding to $x^{20}$ and when an associated flip-flop 442 is in the "reset" state. So lead 446 is put in the "high" condition only when an error occurs in position $x^{21}$. Lead 454 is made high only when an error occurs in position $x^{20}$ and not in $x^{21}$. Flip-flops 442 and 450 and the counter 421 are reset at the beginning of processing of each word by a reset pulse over lead 490.

A word framing generator 492 includes primarily a counter 491 which in its normal operation counts twenty bit times before resetting to begin counting again. Each count is in response to a pulse from a clock 498 which is driven by the received data. During the first nine bit counts, flip-flop 494 is in the "reset" state and lead 496 in the "low" condition. When the count reaches ten, the flip-flop 494 is "set" and remains set for the next eleven bit counts, the lead 496 then being in the "high" condition. The condition of the lead 496 indicates to the buffer register 406 and the syndrome generator 410 which bits of a received code word are data bits and which bits are parity bits. That is, when the lead 496 is in the "low" condition, the bits being received or operated upon by the buffer register and syndrome generator are to be considered data bits; when in the "high" condition, the bits are to be considered parity bits.

Correction of a bit sync loss or gain is accomplished as follows. According to the decision strategy discussed earlier for the shortened (20, 9) Golay code, when bit $x^{21}$ is in error, a synchronization loss of one bit is presumed to have occurred. As already mentioned, when bit $x^{21}$ is detected as being in error, the lead 446 is made "high." This causes activation of an AND gate 474 when the counter 491 reaches the count of 19. In turn, an OR gate 486 responds by giving a "high" output which resets the counter 491 and flip-flop 494. Thus, the counter 491 is reset to begin counting again after only 19 counts rather than the usual 20. When the flip-flop 494 is reset, the lead 496 assumes the "low" condition. In this way, word synchronization of the system is advanced one bit by temporarily shortening the word framing period, specifically the period during which parity bits are being counted or operated upon.

For a bit gain, a similar process is followed except the counter 491 counts one extra bit time rather than one less, such that synchronization is backset one bit.

Shortened cyclic code with $t\geq 2$ error-correcting ability

A cyclic code which is shortened by $\geq 2r+1$ bits, has $t\geq 2$ error-correcting ability, and has $r$ 0's appended to each end of the code words, can be utilized to correct specifically a $\beta \leq r$ synchronization bit gain or less.

The same encoding methods as described in the preceding section are employed to implement the above scheme, except that a provision for inserting "0's" between code words is required. Also, the addition of the preselected polynomial $P(x)$ to each code word may be accomplished differently. The appending of "0's" is accomplished simply by timing the appropriate number of bit times between the outpusing of code words. Since a "0" may be represented as the absence of a pulse, the bit times subsequent to the outpulsing of each word would represent the "0's."

Any $P(x)=\{x^{l-i}\}$ where $1\leq i\leq l-2r-n$ and $l$ is the length of the cyclic code from which the shortened cyclic code is derived, can be used for this sync recovery scheme. If $P(x)=x^{n+2r}$, then addition of $P(x)$ to each code word can be accomplished as in the shortened (20, 9) Golay code example (FIG. 3). For any other $P(x)$ used, the addition is accomplished simply by generating and applying $P(x)$ to a modulo 2 added simultaneously with the application of each code word.

At the receiving terminal $x^rP(x)$ is subtracted (added) from each received code word in the same fashion employed in adding $P(x)$ at the transmitting terminal. The polynomial $x^rP(x)$ rather than $P(x)$ is added at the receiving terminal to account for the $r$ 0's appended to each end of each code word transmitted (i.e., so that the bits of $P(x)$ will be added to the modified code word and not to any of the appended 0's.) The syndrome of the resulting word is then obtained and processed to determine the error pattern of the received word. To this error pattern, the following sync correcting rules are applied.

(1) If $x^{l-1}$ is in error, then it is presumed that a sync slippage has occurred.

(2) If, in addition, one and only one of the error bits is in the bit position corresponding to $x^{l+m-1}$, $|m|\leq r$, while the actual bit of that position is either not transmitted or has the value of zero, then it is presumed that an m-bit loss has occurred if $m$ is positive or that an m-bit gain has occurred if $m$ is negative.

An example illustrating the above principles will now be given. Consider a (15, 7) Bose-Chaudhuri-Hocquenghem code shortened to a (12, 4) code with one zero appended to each end of the code to obtain a (14, 4) code. here $l=15$, $r=1$, and $n=12$. The generator polynomial of the code is $G(x)=1+x^4+x^6+x^7+x^8$. Assuming that the data 1100 is to be transmitted, the encoded word would be $R(x)=010001011100$. Choosing $$P(x)=\{x^{l-r-1}\}=\{x^{13}\}=001011100000 \qquad (7)$$

and $R(x)$ gives $R(x)+P(x)=011010111100$. The message to be transmitted is obtained by appending a "0" to each end or 0 011010111100 0.

Now assume that a one-bit sync loss has occurred at the receiving terminal. The word framing at the receiver would be as shown below 00 011010111100 0
↑ framing ↑

It is known that the left-most bit shown above is a "0" since the words preceding and following the message transmitted would also have a "0" appended to each end. The word obtained from adding $xP(x)$ to the received word is $$\begin{array}{l} 00011010111100\text{—received word} \\ \oplus\,\underline{00010111000000\text{—}xP(x)} \\ \phantom{\oplus\,}00001101111100\text{—}M_1(x) \end{array}$$

Its syndrome is the remainder of $M_1(x)/G(x)$ or $$\begin{aligned} \{M_1(x)\}&=10010111 \\ &=00010111+10000000 \\ &=\{x^{14}\}+\{x^0\} \end{aligned} \qquad (8)$$

which indicates $x^{14}$ and $x^0$ are in error. Since $x^{14}$ is never transmitted and since $x^0$ is known to have been transmitted as "0," from the sync correcting rules given above, it is determined that a synchronization slippage has occurred. Also, since $x^{l+m-1}=x^{14+m}=x^0$, $m=1$ which shows a loss of one bit has occurred.

Assuming that a one-bit sync gain occurred, the received message after adding $xP(x)$ would be $$\begin{array}{l} 01101011110000\text{—received word} \\ \oplus\,\underline{00010111000000\text{—}xP(x)} \\ \phantom{\oplus\,}01111100110000\text{—}M_2(x) \end{array}$$

The syndrome of $M_2(x)$ is $$\begin{aligned} \{M_2(x)\}&=00111001 \\ &=00010111+00101110 \\ &=\{x^{14}\}+\{x^{13}\} \end{aligned} \qquad (9)$$

Position $x^{14}$ being in error indicates a synchronization slippage and $x^{13}=x^{l+m-1}=x^{15-1-1}$ being in error indicates $m=-1$ which shows that a gain of one bit in word synchronization has occurred.

Shortened cyclic codes with $t\geq 1$ error-correcting ability

For a $t\geq 1$ error-correcting cyclic code whose generator polynomial is not divisible by $1+x$, and which has been shortened by two bits and has a "0" appended to each end of the encoded messages, it is possible to detect a single-bit synchronization loss or gain. The appropriate binary word to be added at the transmitting terminal and subtracted at the receiving terminal is either $$P(x)=\left\{\frac{x^{l-1}}{1+x}\right\} \text{ or } P(x)=\frac{x^{l-1}}{(1+x)}$$

where $l$, as before, is the natural length of the cyclic code from which the shortened code is derived.

The appending of "0's" can be accomplished by timing for two bit times subsequent to the outpulsing of each encoded message. Addition of $P(x)$ is done by generating and adding the binary word corresponding to the syndrome of $x^{l-1}/(1+x)$ or $x^{l-1}/(1+x)$ itself to each encoded message. At the receiving terminal, $xP(x)$ is added to the received message. If at the receiving terminal, the error locator determines that bit $x^0$ of the received word is in error and the value of this bit is "0," then a single bit loss is indicated. If it is determined that $x^{l-1}$ is in error and that the value of $x^{l-1}$ is "0," then a bit gain is presumed. The two leads 209 and 210 from the buffer register 208 to the error locator 220 shown in FIG. 2 provide the information concerning the values of the bits corresponding to positions $x^0$ and $x^{l-1}$. A "high" condition on either of the leads 209 and 210 corresponds to the value of "1" on that lead and a "low" condition thereon designates the value "0."

An example of a (15, 11) single error correcting Hamming code shortened to a (13,9) code and utilized to provide one-bit synchronization recovery will now be given. With a "0" appended to each end, it becomes a (15, 9) code.

Assume that the data to be transmitted is 001000101. After encoding using the generator polynomial $x^4+x+1$, and adding $$P(x)=\left\{\frac{x^{l-1}}{1+x}\right\}=\{x^{10}\}$$

or $x^{10}$ and the two 0's, the following is obtained $$\begin{array}{rl} 0010001000101 & \text{—data+parity} \\ \underline{0000000000100} & \text{—}P(x) \\ \oplus\ 0\ 0010001000001\ 0 & \end{array}$$

If a one-bit sync loss occurred, the following message $M_1(x)$ would be obtained, $$\begin{array}{rl} 00\ 0010001000001 & \text{—received message} \\ \underline{00\ 0000000001000} & \text{—}xP(x) \\ \oplus\ 00\ 0010001001001 & \text{—}M_1(x) \end{array}$$

The syndrome of $M_1(x)$ is 1000 which indicates that bit $x^0$ is in error. Since the received value of this bit is "0,", a bit loss is indicated.

For a one-bit gain, the received message would be $$\begin{array}{rl} 0010001000001\ 00 & \text{—received message} \\ \underline{0000000000010\ 00} & \text{—}xP(x) \\ \oplus\ 0010001000011\ 00 & \text{—}M_2(x) \end{array}$$

The syndrome of $M_2(x)$, 1001, indicates that $x^{14}$ is in error, but $x^{14}=0$, so a one-bit sync gain is presumed.

Full-length cyclic codes

A full-length cyclic code which corrects $t$ errors and has minimum distance $d_m$ between code words (distance being defined as the number of bit positions in which code words differ) can be utilized for syn recovery of at least $$r<\frac{n-k-t+[t/2]}{2+[t/2]}\text{ bits} \quad (10)$$

provided $2t \leq d_m-r-2$ where:

$n$=code word length
$k$=number of data bits/code word
$[t/2]$=the greatest integer less than or equal to $t/2$.

If the full error-correcting ability of the code is utilized, then sync recovery is not possible by this scheme since $d_m=2t+1$ for such codes and the inequality $2t \leq d_m-r-2$ or $2t \leq (2t+1)-r-2$ is not satisfied for $r$ positive. This scheme would thus ordinarily be used with those decoding algorithms which do not utilize the full error-correcting capability of the code.

For a full-length cyclic code, no unused bits are available for word synchronization loss identification; thus the binary word P($x$) must be selected in such a way that for any sync slippage $\leq r$, the error patterns generated in the decoding process are different from all correctable *additive* error patterns. A general expression of P($x$) for providing sync recovery for a code defined as above is $$P(x)=\sum_{\sigma=\sigma_0}^{[t/2]} x^{\sigma(r+1)-\sigma_0}+^{n-1} \quad (11)$$

if $r+[t/2]\ r+1)-\sigma_0<n-1$ where $\sigma_0=1+2[t/2]-t$.

Addition of P($x$) at the transmitting terminal and subtraction thereof at the receiving terminal can be accomplished as described for the previous schemes. The strategy for correcting sync slippage is simply to (1) Determine if more than $t$ errors are indicated by the error pattern obtained upon decoding. If so, (2) Process the syndrome from which the error pattern was obtained in accordance with the procedure to be described below to determine if a synchronization slippage has occurred. If a sync loss or gain is detected, apply either a "backset" or "advance" pulse, whichever is appropriate, to the word framing generator.

The syndromes which result from a synchronization slippage of $s \leq r$ bits can be determined as follows (1) Synchronization loss of $s$ bits.—First obtain the remainder $r_1(x)$ of $(1+x^s)P(x)/G(x)$. Leaving the $n$—$s$—$k$ higher order bits of $r_1(x)$ fixed and varying the $s$ lower order bits through all possible combinations gives the $2^s$ possible syndromes for an $s$-bit loss.

(2) Synchronization gain of $s$ bits.—The remainder $$r_g(x)\text{ of }\frac{(1+x^{-s})P(x)+x^{n-s}d^s(x)}{G(x)}$$

for the $2^s$ possible values of the random polynomial $d^s(x)$ of degree at most $s-1$ gives the $2^s$ possible syndromes for an $s$-bit gain.

FIG. 5 shows a circuit for determining from the syndromes described above whether a synchronization slippage of two or less bits has occurred. It is assumed for this circuit that an $(n, k)$ cyclic code meeting the previously described constraints is being used where $n-k=6$ and that the synchronization recovery capability of the code is two (i.e. $r=2$). The circuit comprises an $n-k=6$ stage syndrome generator 502 which receives data from a receiver (not shown) and generates therefrom the syndrome of $(1+x^s)P(x)/G(x)$ or $r_1(x)$, for $s \leq 2$. The rightmost stages of the syndrome generator correspond to the higher-order bits of the syndrome. In (1) above, it was pointed out that a synochronization loss of $s$ bits was characterized by the syndromes $r_1(x)$ in which the $n-k-s$ higher order bits were fixed and the $s$ lower order bits varied over all possible values. The circuit in FIG. 5 thus detects an $s=1$ bit synchronization loss by detecting a specific characteristic pattern in the $n-k-s=6-1=5$ "fixed" higher-order stages of the syndrome generator 502. That is, an AND gate 510 is enabled only when a specific pattern indicating a 1-bit sync loss is generated in the syndrome generator 502. Lead 546 from a shift pulse generator 538 is in the low or "0" condition at this time, which condition is inverted by an inverter-gate 526 to a high or "1" condition. The output of the gates 526 and 510, both being high, enable an AND gate 518 thus indicating that a synchronization loss of one bit has occurred. A 2-bit sync loss is characterized by the $n-k-s=6-2=4$ "fixed" higher-order bits of the syndrome $r_1(x)$. Thus, if a 2-bit sync loss occurs, the specific pattern generated in the syndrome generator 502 which indicates this will enable an AND gate 506. The output of the gate 506 coupled with the low or "0" condition of lead 542 from the shift pulse generator 538 (inverted to a "1" condition by an inverter gate 522) enables an AND gate 514, indicating that a 2-bit sync loss has occurred.

If no output is obtained from either of the gates 518 or 514, the shift pulse generator 538 applies a shift pulse to the syndrome generator 502 and causes lead 546 to assume a high or "1" condition. If a 1-bit sync gain has occurred, application of the shift pulse to the syndrome generator transforms the 1-bit sync gain syndrome $r_g(x)$ generated by the generator into the 1-bit sync loss syndrome $r_1(x)$. The resulting pattern in the five higher-order stages of the syndrome generator enables the AND gate 510 which in turn enables an AND gate 534 in conjunction with the "1" condition of lead 546. The enabling of gate 534 thus indicates that a 1-bit sync gain has occurred.

If no output from the gate 534 results after a single shift of the contents of the syndrome generator 502, another shift pulse is applied by the shift pulse generator 538, lead 546 is made to assume a "0" condition again, and lead 542 is made to assume a "1" condition. If a 2-bit sync gain has occurred, shifting the contents of the syndrome generator 502 twice transforms the 2-bit sync gain syndrome $r_g(x)$ into the 2-bit sync loss syndrome $r_1(x)$. The resulting pattern registered in the four higher-order stages of the syndrome generator 502 enables the AND gate 506. The output of the gate 506 and the "1" condition on lead 542 enables a gate 530 indicating that a 2-bit sync gain has occurred.

Cyclic codes used only for error correction

The method of synchronization recovery to be described here is limiting in that only certain cyclic codes can be utilized. It has the advantage, over the previous scheme, however, in that the constraint $2t \leq d_m - r - 2$ need not be satisfied.

If:

(1) code $C_1$, generated by $G_1(x)$, corrects $t_1$ errors,
(2) code $C_2$, generated by $G_2(x)$, corrects $t_2$ errors,
(3) $G_1(x) = G_2(x)$, where $R(x)$ is not evenly divisible by $1+x$, and
(4) $$2t_2 > t_1$$

then code $C_1$ can be utilized to provide sync recovery capability of at least one bit. Possible choices of $P(x)$ for this scheme are $$P(x) = \left\{ \frac{G_2(x)}{1+x} \right\}$$

if the weight of $G_2(x)$ is even (has even number of 1's) or $$P(x) = \left\{ \frac{G_2(x)+1}{1+x} \right\}$$

if $G_2(x)$ has odd weight.

As in the preceding cases, $P(x)$ is added and subtracted from each code word at the transmitting and receiving terminals respectively. Detection of synchronization slippage can be accomplished either by comparing the syndromes of the received words with a list of syndromes known to occur when a sync loss or gain occurs or by utilizing a circuit similar to that shown in FIG. 5.

An example of a (15, 5) Bose-Chaudhuri-Hocquenghem triple-error-correcting code will now be given. The polynomial for generating this code is $$G_1(x) = (x^4+x+1)(x^4+x^3+x^2+x+1)(x^2+x+1) = G_2(x)(x^2+x+1)$$

where $G_2(x)$ is the generator polynomial of a double-error-correcting BCH code. Since $R(x) = x^2+x+1$ is not evenly divisible by $1+x$ and $2t_2 = 4 > 3 = t_1$, the (15, 5) BCH code meets the requirements above for a code having a sync recovery capability of at least one bit.

Since $G_2(x)$ has odd weight, $P(x)$ is chosen as $$P(x) = \frac{G_2(x)+1}{1+x} = \frac{x^8+x^7+x^6+x^4}{1+x} = x^7+x^5+x^4$$

If a bit loss occurs, the syndromes generated from the word resulting from the subtraction of $P(x)$ from the received word are $x^8+x^7+x^6+x^4$ if the bit lost is a "1" and $x^8+x^7+x^6+x^4+1$ if the bit lost is a "0." For a bit gain, the syndrome $x^9+x^6+x^5+x^4+x+1$ would be generated if the extra bit included in the word framing was a "0" and the syndrome $x^7+x^6+x^5+x^3$ would be generated if the extra bit was a "1." It can be easily shown that the above four syndromes would not be generated from any received word containing three or less errors. Thus a sync loss or gain of one bit would never be mistaken for additive error of three or less or vice-versa and thus can be detected and corrected.

It is emphasized that although specific codes were utilized for the purpose of illustrating the various applications of the present invention, the principles of the present invention are clearly applicable to any code meeting the requirements set forth.

Five specific illustrative embodiments of the invention were described. Although each embodiment differs from every other in some way, they all require that the data words to be transmitted be modified by the addition of a preselected binary word. After receipt of the modified word, another binary word is subtracted therefrom and the resulting word processed according to a particular decoding strategy. This decoding process reveals whether a synchronization loss or gain has occurred and then steps are taken to recover the synchronization.

It is noted that detailed circuit configurations for the units 336, 360, 402, 406, 410, 420, 498 and 538 shown in FIGS. 3, 4 and 5 have not been given herein because their arrangements are considered to be clearly within the skill of the art. In view of FIGS. 1 and 2 showing a generalized illustrative synchronization recovery system, and FIGS. 3 and 4 showing a detailed specific embodiment of a synchronization recovery system utilizing the principles of the present invention, further detailed circuit configurations illustrating other specific embodiments of the present invention described herein are deemed unnecessary.

Finally, it is understood that the above-described arrangements are only illustrative of the application of the principles of the present invention. Numerous other modifications and alternative arrangements may be devised by those skilled in the art without departing from the spirit and scope of the invention.

What is claimed is:

1. In combination in a data processing system containing a source of information and means for encoding said information into code words comprising a cyclic code and having a $\geq 1$ error-correcting capability, means for modifying each of said words to be transmitted by addition of a fixed sequence, $P(x)$, where $P(x)$ is chosen so that error patterns obtained in any decoding process for correctable synchronization loss will be different from error patterns obtained for correctable additive errors, means for applying said modified code words to one end of a transmission channel, means connected to the other end of said channel for subtracting a fixed sequence $P'(x)$ from each received code word, where $P'(x)$ is chosen so that error patterns obtained in any decoding process would be the same as those obtained if $P(x)$ were the fixed sequence subtracted, and means for processing each word obtained from said subtraction and for automatically correcting certain synchronization losses of said data transmission system.

2. A combination as in claim 1 in which said processing and correcting means comprises means for simultaneously applying the words obtained from said subtraction to a buffer register storing means for temporarily storing said words and to a syndrome generating means for generating a syndrome from each of said words, and an error locator means connected to said generating means for generating an error pattern word from each of said syndromes.

3. A combination as in claim 2 including a synchronization loss detection means connected to said error locator means for processing said error pattern words in accordance with a predetermined decoding strategy to determine whether a synchronization gain or loss has occurred in said data transmission system.

4. A combination as in claim 3 further including a word framing generator means responsive to said synchronization loss detector means for advancing or backsetting word framing of said buffer register storing means and syndrome generating means to recover synchronization of said system.

5. A combination as in claim 4 in which said encoding means comprises a feedback shift register for encoding information into a binary cyclic code shortened by at least $2r+1$ bits, having a $t \geq 2r+1$ bit error-correcting ability and an $r$-bit synchronization recovery ability, means for applying a bit "1" to the feedback path of said shift register just as or after said shift register applies the last bit of the previously-encoded binary word to a transmitting means and before the next data word is presented to the shift register for encoding, and means for adding said data word to the contents of said shift register resulting from the application of said bit to said feedback path.

6. A combination as in claim 5 in which said syndrome generating means comprises a feedback shift register and means for applying a bit "1" to the feedback path of said shift register just as or after the last bit of the previously-generated syndrome is applied to the error locator means and before the next received word is presented for circulation through the shift register, means for adding said next received word to the contents of said shift register resulting from the application of said bit to said feedback path, and means for circulating the resulting word through the shift register to obtain the syndrome of said received word.

7. A combination as in claim 6 in which said error locator means comprises a binary counting circuit and decoding logic for determining from the syndromes received from said syndrome generating means the error positions in each of said received words and for signaling the synchronization loss detection means when it is determined that either the bit corresponding to $x^n$ of the received word is in error, but not any $x^k$, $n<k\leq l-1$ where $l$ is the length of the cyclic code from which the shortened code is derived and $n$ is the length of each code word, or that the bit corresponding to $x^{n+\beta}$, $1\leq\beta\leq r$, is in error.

8. A combination as in claim 7 in which said synchronization loss detection means includes a signaling means for applying a "backset" signal to said word framing generator means in response to a signal from said error locator means that the bit corresponding to $x^n$ of the received word is in error and for applying an "advance" signal to said word framing generator means in response to a signal from said error locator means that the bit corresponding to $x^{n+\beta}$ is in error.

9. A combination as in claim 8 in which said word framing generator means comprises a binary counting circuit and associated logic for extending the word framing period of said data system one bit time in response to a "backset" signal or for reducing the word framing period one bit time in response to an "advance" signal.

10. A combination as in claim 4 in which said encoding means comprises means for encoding information into a binary cyclic code shortened by at least $3r+1$ and having a $t\geq 2r+2$ bit error-correcting ability, means for modifying each of said code words by addition modulo 2 of a preselected binary sequence $$P(x)=\left\{x^n+\left[\frac{3r+1}{2}\right]\right\}$$

where $n$ is the length of the shortened code and $$\left[\frac{3r+1}{2}\right]$$

represents the greatest integer less than or equal to $$\frac{3r+1}{2}$$

11. A combination as in claim 10 in which said subtracting means includes means for generating the fixed binary sequence $P(x)$ and for subtracting said sequence from each received code word.

12. A combination as in claim 11 in which said synchronization loss detection means comprises means for processing said error patterns to determine a first condition, whether the bit corresponding to $$x^{n}+\left[\frac{3r+1}{2}\right]$$

is in error, and, in addition, to determine a second condition, whether the bit corresponding to $$x^{n}+\left[\frac{3r+1}{2}\right]+\beta$$

is in error, $0<\beta\leq r$, and a third condition, whether the bit corresponding to $$x^{n}+\left[\frac{3r+1}{2}\right]-\beta$$

is in error.

13. A combination as in claim 12 in which said word framing generator means comprises means for advancing the word framing of said data system $\beta$ bits in response to a determination that said first and second conditions exist or for backsetting the word framing $\beta$ bits in response to a determination that said first and third conditions exist.

14. A combination as in claim 4 in which said encoding means comprises means for encoding said information into a binary cyclic code shortened by at least $2r+1$ bits, having a $t\geq 2$ error-correcting ability, and an $r$-bit synchronization recovery ability, means for modifying each of said code words by addition modulo 2 of a preselected binary sequence $P(x)=\{x^{l-1}\}$, $1\leq i\leq l-2r-n$, where $l$ is the length of the cyclic code from which the shortened code is derived and $n$ is the length of the shortened code, and means for appending $r$ "0's" to each end of said code words by timing $2r$ bit times between outpulsing of said words.

15. A combination as in claim 14 in which said subtracting means includes means for generating the fixed binary sequence $x^rP(x)$ and for subtracting said sequence from each received word.

16. A combination as in claim 15 in which said synchronization loss detection means comprises means for processing said error patterns to determine if the bit corresponding to $x^{l-m-1}$ either was not transmitted, because if one and only one of the other bits in error corresponds to position $x^{l-m-1}$, $|m|\leq r$, and to determine if the bit corresponding to $xl^{-m-1}$ either was not transmitted, because it was a virtual bit, or has the value "0."

17. A combination as in claim 16 in which said word framing generator means comprises means for advancing the word framing of said data system $m$ bits in response to a determination that $m$ is positive or for backsetting word framing $m$ bits in response to a determination that $m$ is negative.

18. A combination as in claim 4 in which said encoding means comprises means for encoding said information into a binary cyclic code which has been shortened by two bits, has $t\geq 1$ error-correcting ability, and whose generator polynomial is not divisible by $1+x$, means for modifying each of said code words by addition modulo 2 of a preselected binary sequence $$P(x)=\left\{\frac{x^{l-1}}{1+x}\right\}\text{or}=\frac{x^{l-1}}{1+x}$$

where $l$ is the length of the cyclic code from which the shortened code is derived, and means for appending a "0" to each end of said code words by timing two bit times between outpulsing of said code words.

19. A combination as in claim 18 in which said substracting means includes means for generating the fixed binary sequence $xP(x)$ and for subtracting said sequence from each received word.

20. A combination as in claim 19 in which said synchronization loss detection means comprises means for processing said error pattern to determine the existence of a first condition in which the bit corresponding to $x^0$ of the received word is in error and the value of said bit is "0," and further means for determining from said error pattern if a second condition exists in which the bit corresponding to $x^{l-1}$ is in error and the value of $x^{l-1}$ is "0."

21. A combination as in claim 20 in which said word framing generator means comprises means for advancing the word framing of said data system by one bit in response to a determination that said first condition exists and for backsetting the word framing by one bit in response to a determination that said second condition exists.

22. A combination as in claim 1 in which said encoding means comprises means for encoding said information into a binary cyclic code having $t$ error-correcting ability and minimum distance $d_m$ between code words, means for modifying said code words by addition modulo 2 of a preselected binary word $$P(x)=\sum_{\sigma=\sigma_0}^{[t/2]}x^{\sigma(r+1)}-\sigma_0+x^{n-1}$$

where $n$ is the code word length, $[t/2]$ is the greatest integer just less than or equal to $t/2$, $2t\leq d_m-r-2$, $r+[t/2](r+1)-\sigma_0<n-1$, and $\sigma_0=1+[t/2]-t$.

23. A combination as in claim 22 in which said subtracting means includes means for generating the binary sequence $P(x)$ and for subtracting said sequence from each received code word.

24. A combination as in claim 23 in which said processing and correcting means comprises means for generating the syndrome of each binary word obtained from said subtraction, means for generating a binary word error pattern from each of said syndromes, means for processing said error pattern to determine if the recived word has $t$ or more errors and for signaling a processing means if said condition exists, processing means for processing said syndrome from which said error pattern was obtained to determine the synchronization condition of said data system, and means for backsetting word framing of said data system if it is determined that said syndrome resulted from a a synchronization gain and for advancing word framing of said data system if it is determined that said syndrome resulted from a synchronization loss.

25. A combination as in claim 1 in which said encoding means comprises means for encoding said information into a binary cyclic code $C_1$ having $t_1$ error-correcting ability and generated by a generator polynomial $G_1(x)$, said code being associated with another binary cyclic code $C_2$ having $t_2$ error-correcting ability and generated by a generator polynominal $G_2(x)$ in which $$G_1(x)=G_2(x)R(x)$$

where $R(x)$ is not evenly divisible by $1+x$, and $2t_2>t_1$, and means for modifying said code words of code $C_1$ by addition modulo 2 of a preselected binary word $$P(x)\left\{\frac{G_{2(x)}}{1+x}\right\}$$

if $G_{2(x)}$ has *even* weight or $$P(x)\left\{\frac{G_{2(x)}+1}{1+x}\right\}$$

if $G_{2(x)}$ has *odd* weight.

26. A combination as in claim 25 in which said subtracting means includes means for generating said same fixed sequence $P(x)$ and for subtracting said sequence from each received code word.

27. A combination as in claim 26 in which said processing and correcting means comprises means for generating the syndrome of each word obtained from said subtraction, means for processing said syndrome to determine the synchronization condition of said data system, and means for backsetting the word framing of said data system by $\beta$ bits if it is determined that said syndrome resulted from a synchronization gain of $\beta$ bits and for advancing word framing of said data system by $\beta$ bits if it is determined that said syndrome resulted from a synchronization loss of $\beta$ bits.

28. A data transmission system comprising a source of information, means for encoding said information into a shortened binary cyclic code having a $\geq 1$ error-correcting capability, means for modifying each code word to be transmitted according to a fixed predetermined strategy, means for transmitting said modified code words over a transmission channel to a receiving terminal, means located in said receiving terminal for modifying each received word according to another fixed predetermined strategy, and decoding means for utilizing the virtual bit positions of said transmitted word for determining the synchronization condition of said data transmission system.

29. A combination as in claim 28 further comprising synchronization recovery means responsive to said decoding means for restoring synchronization of said data system in at most one word time.

30. A data transmission system comprising a source of information, means for encoding said information into a cyclic code having a $\geq 1$ error-correcting capability, means for modifying each of said code words in a predetermined manner, means for applying said modified words to one end of a transmission channel, means connected to the other end of said channel for modifying each received word in a predetermined manner, and decoding means responsive to said last-mentioned modifying means for determining and distinguishing additive errors and synchronization errors.

References Cited

UNITED STATES PATENTS

| | | | |
|---|---|---|---|
| 3,159,811 | 12/1964 | James et al. | 340—146.1 |
| 3,227,999 | 1/1966 | Hagelbarger | 340—146.1 |
| 3,336,467 | 8/1967 | Frey | 340—146.1 X |
| 3,376,385 | 4/1968 | Smith et al. | 178—69.5 |

MALCOLM A. MORRISON, Primary Examiner

R. STEPHEN DILDINE, Jr., Assistant Examiner

U.S. Cl. X.R.

178—69.5